Jan. 3, 1933.

Z. R. MAULSBY ET AL

FABRIC FORMING MACHINE

Re. 18,705

Original Filed Sept. 24, 1925 2 Sheets-Sheet 1

INVENTOR
ZENE R. MAULSBY
JOHN R. MAULSBY
BY
Cook & Robinson
ATTORNEY

Jan. 3, 1933.

Z. R. MAULSBY ET AL

FABRIC FORMING MACHINE

Re. 18,705

Original Filed Sept. 24, 1925 2 Sheets-Sheet 2

INVENTOR
ZENE R. MAULSBY
JOHN R. MAULSBY
BY
Cook & Robinson
ATTORNEY

Reissued Jan. 3, 1933

Re. 18,705

UNITED STATES PATENT OFFICE

ZENE R. MAULSBY AND JOHN R. MAULSBY, OF EVERETT, WASHINGTON, ASSIGNORS TO MAULSBY MACHINE COMPANY, INC., OF EVERETT, WASHINGTON

FABRIC FORMING MACHINE

Original No. 1,733,353, dated October 29, 1929, Serial No. 58,354, filed September 24, 1925. Reissue No. 18,146, dated August 4, 1931, Serial No. 431,038, filed February 24, 1930. This application for reissue filed August 28, 1931. Serial No. 560,025.

This invention relates to improvements in forming machines, and more particularly to machines for forming fabrics into decorative designs; it being the principal object of the invention to provide a machine for crimping or shaping fine fabrics into designs suitable for decorative purposes such as for the lining of caskets and the like.

More specifically stated, the objects of this invention reside in the provision of a machine for the above stated purpose, in which there are forming elements which may be of various shapes arranged in a manner permitting a piece of fabric to be spread thereover, and wherein means is provided for gathering and shaping the fabric about the forming elements and for retaining it while it is treated or secured to a backing so that it will be retained in its given shape after being removed from the machine.

Other objects reside in the various details of construction and combination of parts embodied in the invention and in their mode of operation as will hereinafter be described.

In accomplishing these and other objects of the invention, we have provided the improved details of construction, the preferred forms of which are illustrated in the accompanying drawings, wherein—

Referring more in detail to the several views of the drawings—

1 designates a rectangular frame or table supported at a suitable working height by legs 2 placed at its four corners. The frame comprises the longitudinal, opposite side rails 3—3 and the opposite end rails 4—4, one of the latter having an upstanding flange 5 provided along the outer edge against which the ends of bars 6 supported on the frame may be alined.

The bars 6 are arranged in parallel relation on the frame and may be adjusted from and toward each other. It is preferred that the ends of all the bars be joined by the lazy tong mechanism as at 7 so that when adjustment of the bars from or toward each other is made, an equal spacing between the several bars will be automatically maintained.

The bars 6 preferably would be flat iron pieces placed on edge and provided at their ends with cross pieces 8 whereby the movement of the bars together is limited.

Figure 6:
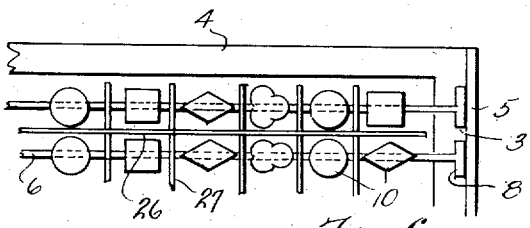
Figure 6 is a partial plan view showing forming blocks of different design.

Slidably mounted on each of the bars 6 are the forming blocks 10, each of which is provided with a downwardly opening slot 11 which receives its supporting bar and which permits the blocks to be adjusted from or toward each other. The blocks may be made in various shapes such as round, square, or oblong. They may also be made to represent characteristic designs, as shown in Figure 6, which shows a clover leaf, diamond and circular forms.

Figure 1:
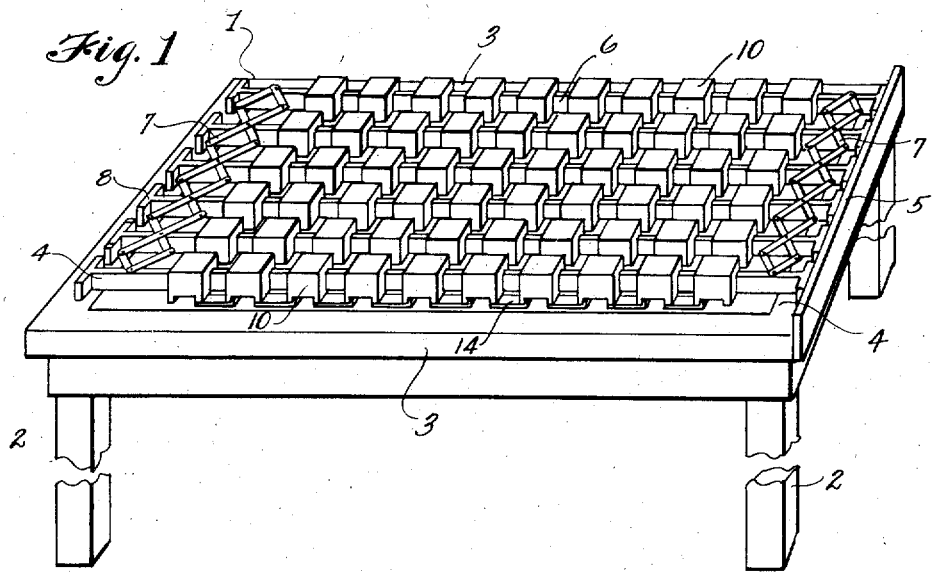
Figure 1 is a perspective view of a cloth forming machine embodied by the present invention.
Figure 2:
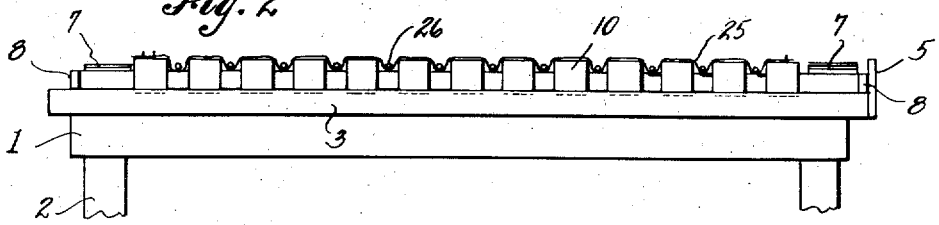
Figure 2 is a side view of the same.
Figure 3:
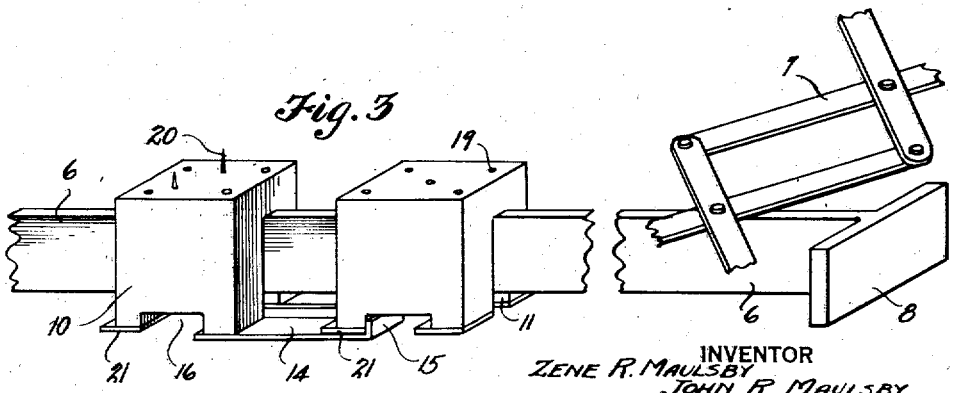
Figure 3 is an enlarged perspective view of a bar and some of the forming blocks thereon.

In order to limit the distance of spacing of the blocks apart on each bar, we have fixed plates 14 to the under side at one edge of each block and these plates extend beneath an adjacent block and have upturned hooks 15 at their ends adapted to engage with the ends of slots 16 in the under sides of the blocks, as shown in Figure 3.

The plates 14 are adjustably fastened to the blocks by means of set screws 17 extended through slots 18 in the plates and this provides for adjusting the plates so as to vary the spacing distance.

To limit the distance of movement of the blocks toward each other, heel plates 21 are fixed to the edges of the blocks opposite the edges to which plates 14 are fixed and these are adapted to engage the edges of adjacent blocks.

On the upper surface of each of the end blocks, and on the intermediate blocks if desired, there is provided a plurality of holes 19 in which short upwardly directed pins 20 may be removably inserted to serve as a means for retaining the cloth in place when it is placed over the blocks for forming.

Figure 4:
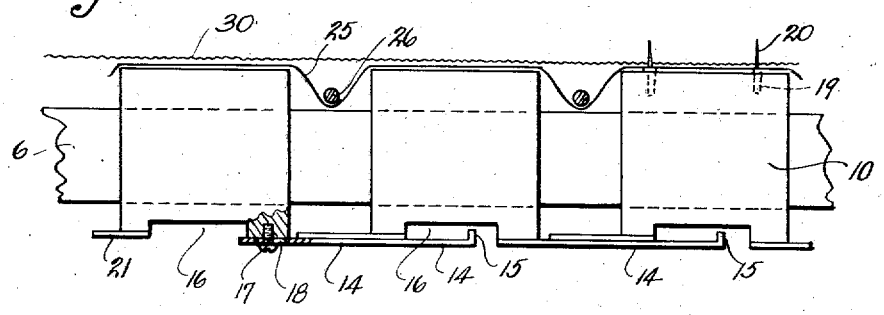
Figure 4 is an enlarged fragmental section longitudinally of the machine.
Figure 5:
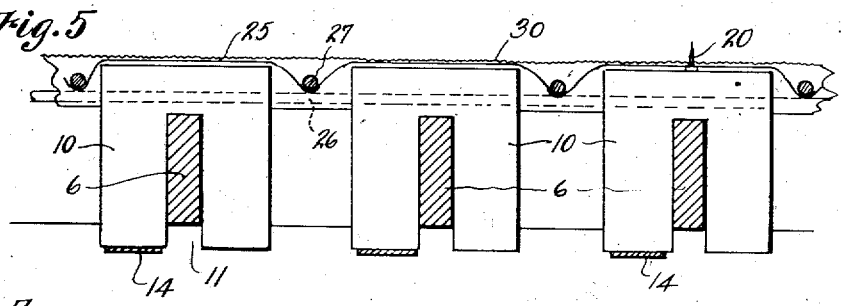
Figure 5 is an enlarged fragmental section transversely of the same.

In using the device, the bars 6 are first moved apart to a desired spacing and the blocks are spread apart on the several bars and the pins 20 are placed in the end blocks and others at places desired. The piece of cloth which is to be formed, as designated at 25 in Figures 4 and 5, is placed over the forming blocks and is pressed down over the pins so that it will be held thereby. Rods 26 are then placed upon the cloth longitudinally of the frame between each row of blocks and other rods 27 are placed transversely thereof between the alined blocks of the several rows. The bars 6 are then moved toward each other to the distance provided for and the blocks are closed together on the bars so that the cloth is crimped downwardly between each bar and also between each transversely alined row of blocks.

After this is done, a piece of heavy fabric 30 as a backing, is placed over the frame and it is tacked by stitching to the formed fabric. The rods 26 and 27 are then withdrawn and the shaped cloth removed.

Figure 7:
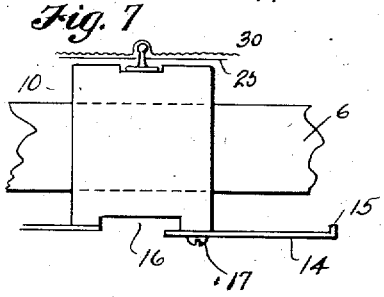
Figure 7 is a detail view of an alternative type of block and fastener.

If it is desired, snap fasteners such as indicated in Figure 7, may be used to attach the formed piece of material to the backing, or paste may be used for certain work.

It is quite apparent that when the cloth or fabric is drawn down about the forming blocks, it will assume the definite shapes of the upper end portions of the blocks, which in this instance serve in the nature of molds. Then when the cloth is fastened to the backing and removed from the blocks, it retains the puffs in the definite and distinct shapes of the mold blocks. The present device is distinguished from other machines now generally in use in that it provides for making definite shapes, or forms; whereas, the other machines are simply for crinkling or shirring the cloth, and like United States Patent No. 1,042,715, issued on October 29, 1912, to A. F. Mrock, do not give the fabric any definite or distinct design. The essential feature of this machine resides in the provision of means for gathering in a fullness of material about each of the forming elements so that the designs will be formed in the fabric without any stretching or damaging thereof. This is possible by reason of the fact that in shaping the fabric about each of the individual elements, a fullness of surrounding material results, and from this extra amount of fullness of material, the additional amount required for the shaping of the fabric about adjacent elements is drawn.

It is possible that the forming elements be stationary. Manifestly, so long as a fullness of fabric can be created when shaped about the individual elements, it is not necessary that they have relative movement to effect this result.

Figure 8:
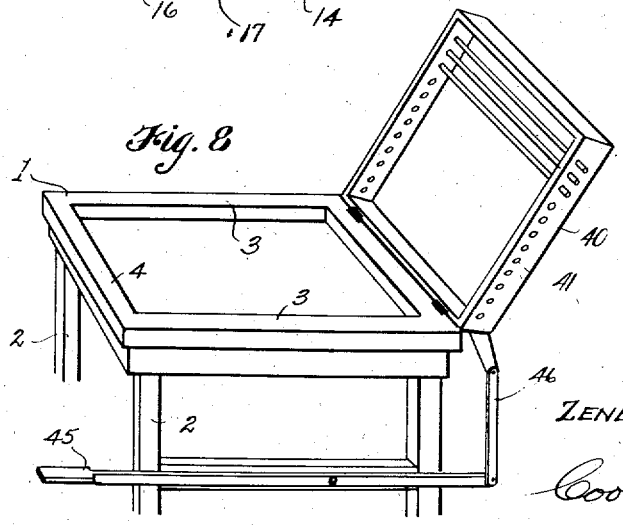
Figure 8 is a perspective view of an alternative construction.

In an alternative construction shown in Fig. 8, we have shown a frame 40 hingedly attached to the frame 1 to swing upward from and downwardly over the forming blocks. This frame 40 has side rails provided with holes 41 for receiving the cross rods 27 so that they may be moved bodily against the cloth between the forming blocks. This frame could be operated by a foot pedal 45 connected operatively to the frame by suitable mechanism as indicated at 46.

Having thus described our invention, what we claim as new therein and desire to secure by Letters-Patent is:

1. In a fabric forming machine of the character described, a frame, a bed of fabric shaping elements mounted in the frame and movable from and toward each other, both lengthwise and transversely of the frame and spaced from each other, and over which a fabric piece may be spread, means associated therewith for drawing the said fabric piece about all sides of said shaping elements except their mounting surfaces, incident to their being moved together, thereby to cause the fabric to conform to the shape of the elements.

2. In a machine of the character described, a plurality of fabric shaping blocks in characteristic shapes or designs, mounted for movement from and toward each other, and over which a fabric piece may be applied, means on the blocks for holding the fabric piece in place against slippage relative thereto and means for drawing the fabric piece downward and against all sides of the blocks except their mounting surfaces so as to shape it in accordance with the definite shapes of the blocks.

3. A fabric forming machine, comprising a frame, a plurality of bars supported in parallel relation in the frame for adjustment toward each other, a plurality of fabric shaping elements slidable on each of the said bars and adjustable toward each other, and over which a fabric piece may be applied; said elements each being of a definite design, and means for drawing the fabric piece about the elements to embody therein definite shapes corresponding to the shapes of the elements.

4. A fabric shaping machine comprising a horizontal frame structure, a plurality of bars mounted on the frame structure, lazy tong mechanism joining the ends of the bars to retain them in parallel relation during adjustment from and toward each other, a plurality of forming blocks mounted slidably on each of the bars, having slots in their under sides, a plate fixed to the under side of each block and extended beneath the adjacent block and there provided with an upturned portion projecting into the slot of the block as a means of limiting the extent of their spacing from each other and rods adapted to be placed over the fabric to depress it about the forming blocks.

5. In a machine of the character described, a plurality of shaping elements arranged on a base in spaced relation and over which a piece of fabric may be spread and means for drawing the fabric piece over and gathering it about all sides of the shaping elements except their mounting surfaces.

6. In a machine of the character described, a plurality of shaping elements arranged on a base in spaced relation, and over which a fabric piece may be spread, means whereby the elements may be moved toward each other and means whereby the fabric may be drawn down over the elements and gathered about all sides except their mounting surfaces coincident with the movement toward each other.

7. In a machine of the character described, a base, a plurality of fabric shaping elements arranged thereon in spaced relation and across which a fabric piece may be spread and means arranged to act against the fabric piece whereby it will be folded down about each of the said elements and gathered about all sides thereof except their mounting surfaces to create designs corresponding to the shape of the elements and providing a fullness of material between the elements from which material for the adjacent designs is drawn without stretching or causing damage to the fabric.

Signed at Everett, Snohomish County, Washington, this 5th day of February, 1932.

ZENE R. MAULSBY.
JOHN R. MAULSBY.